United States Patent
Tünker et al.

[11] Patent Number: 6,057,037
[45] Date of Patent: May 2, 2000

[54] SUBSTRATE COATED WITH A LEAD-FREE GLASS COMPOSITION

[75] Inventors: Gerhard Tünker, Offenbach; Hildegard Paulus, Frankfurt, both of Germany

[73] Assignee: Cerdec Aktiengesellschaft Keramische Farben, Frankfurt, Germany

[21] Appl. No.: 09/310,576

[22] Filed: May 12, 1999

Related U.S. Application Data

[62] Division of application No. 08/813,033, Mar. 6, 1997, Pat. No. 5,939,343, which is a division of application No. 08/592,636, Jan. 26, 1996, abandoned.

[30] Foreign Application Priority Data

Jan. 28, 1995 [DE] Germany .......................... 195 02 653

[51] Int. Cl.⁷ .................................................. B32B 17/06
[52] U.S. Cl. ........................ 428/426; 428/433; 428/434; 501/17; 501/21
[58] Field of Search ................. 501/17, 16, 21, 501/23, 32; 428/426, 433, 434

[56] References Cited

U.S. PATENT DOCUMENTS

| | | | |
|---|---|---|---|
| 2,753,271 | 7/1956 | Treptow | 106/48 |
| 3,017,279 | 1/1962 | Dolah et al. | 106/48 |
| 3,216,847 | 11/1965 | Armant | 117/70 |
| 3,278,284 | 10/1966 | Van Dolah et al. | 501/59 |
| 3,481,757 | 12/1969 | Van Dolah et al. | 501/59 |
| 4,959,090 | 9/1990 | Reinherz | 501/18 |
| 5,093,285 | 3/1992 | Murkens | 501/17 |
| 5,141,798 | 8/1992 | Chaumonot et al. | 428/195 |
| 5,203,902 | 4/1993 | Murkens | 501/17 |
| 5,308,803 | 5/1994 | Clifford et al. | 501/17 |
| 5,350,718 | 9/1994 | Anquetil et al. | 501/21 |
| 5,710,081 | 1/1998 | Tünker | 501/21 |

FOREIGN PATENT DOCUMENTS

| | | |
|---|---|---|
| 267 154 | 5/1988 | European Pat. Off. . |
| 0 362 136 | 4/1990 | European Pat. Off. . |
| 0 370 683 | 5/1990 | European Pat. Off. . |
| 0 505 892 | 9/1992 | European Pat. Off. . |
| 504 682 | 9/1992 | European Pat. Off. . |
| 0 518 610 | 12/1992 | European Pat. Off. . |
| 1 496 493 | 9/1970 | Germany . |
| 1 007 296 | 10/1965 | United Kingdom . |
| 92/04290 | 3/1992 | WIPO . |

*Primary Examiner*—Karl Group
*Attorney, Agent, or Firm*—Wenderoth, Lind & Ponack, L.L.P.

[57] ABSTRACT

The invention provides a new lead-free glass composition, a glass frit of this composition, a process for its production and also coloring preparations containing such a glass frit and the use thereof. The glass composition according to the invention contains in mol-%

| | |
|---|---|
| $K_2O$ | 10–17 |
| $B_2O_3$ | 10–25 |
| $TiO_2$ | 15–30 |
| $SiO_2$ | 35–55 |
| $Al_2O_3$ | 0–5 |
| $Bi_2O_3$ | 0–5 |
| S | 0–3 | and any oxide from the group consisting of PbO, CdO, ZnO, $Li_2O$, $Na_2O$, MgO, CaO, SrO, BaO and $P_2O_5$ which is present being present in a quantity of less than 0.5 wt-% in each case. Glass frits of this composition are very suitable for use in coloring preparations for the production of glass enamels, in particular for panes of glass for automobiles. Glass frits according to the invention can be stoved at low temperatures, exhibit good anti-sticking properties, a high resistance to acids and a diminished migration of silver.

20 Claims, No Drawings

SUBSTRATE COATED WITH A LEAD-FREE GLASS COMPOSITION

This application is a division of application Ser. No. 08/813,033, filed Mar. 6, 1997, U.S. Pat. No. 5,939,343, which is a divisional of application Ser. No. 08/592,636, filed Jan. 26, 1996 now abandoned.

The invention provides a now lead-free glass composition, a glass frit produced from thio composition and & process for its production. The invention also provides a colouring preparation containing the glass frit according to the invention and its use for the production of glass enamels and ceramic decorations on stovable substrates, in particular glass.

BACKGROUND OF THE INVENTION

In the decoration of glass articles, in particular panes of glass, glass colorants are used that contain one or more colour-imparting components and one or more glass frits. The glass colorant is stoved after being applied to the substrate, whereby a glass enamel is formed. In the application of glass colorants onto panes of glass the melting behaviour of the glass colorants has to be adapted to the typical conditions of the bending and prestressing process. Typical staving conditions are glass temperatures between about 600 and 650° C. and firing-times of a few minutes. The colour decoration of panes of glass in the architectural and instrument-glass fields necessitates good compatibility of the glass frits contained in the glass colorant with conventional inorganic colouring pigments.

In the field of glass for automobiles in particular, black glass colorants are needed that possess an optimal degree of opacity. Furthermore, in the case of rear windows it has to be possible for the pane of glass that is coated with a glass colorant to be imprinted with a silver conductive pasta for the purpose of forming conducting paths. Lastly, during the stoving process and deformation of the pane any migration of silver through the colorant into the glass should be avoided, since migration results in yellowing of the float glass. A further characteristic that is demanded of glass colorants for the automobile-glass field is that the fused-on colorant should not bond to the pressing tool in the course of the deformation of the pans in accordance with the so-called press-and-bend process.

In many fields of application, including the automobile-glass field, a high resistance to galvano-electrolytes (pH less than 1) is demanded of the stoved glass colorant—that is to say, of the glass enamel, Finally, no lead or cadmium should be contained in the glass frit that is used in the glass colorant.

In the specialist field various lead-free and cadmium-free glass frits and colouring preparations which contain such frits are known for various applications, including the formation of glass enamels on panes of glass for automobiles. Ordinarily, these are frit based on a bismuth/alkali/boron-silicate glass or on an alkali/zinc/boron-silicate glass or mixtures thereof.

Known glass-frit systems satisfy the aforementioned requirements only in part: thus the lead-free and cadmium-free glass frit according to EP-A 0 267 154 is based on a content of $Na_2O$, $ZnO$, $B_2O_3$ and $SiO_2$ and may contain a number of other oxides such as $Bi_2O_3$ and $Li_2O$. However, as the examples show, only glass frits with a $B_2O_3$ or $Li_2O$ content satisfy the fuse-on range of clearly below 650 C. that is required for application onto glass. A disadvantage of glass frits that contain lithium is that with this process they result in the fracture resistance of panes of glass enamelled therewith being reduced.

In EP-A 0 370 683 a glass flux with 45 to 65 wt-% $Bi_2O_3$ and also colouring preparations containing such a frit are described with a view to the production of glass enamels. By the use of such colouring preparations for producing enamelled panes of glass for automobiles, adhesion of the panes imprinted therewith within the bending mould is avoided. This is achieved by means of a crystallization process which sets in after the colorant has been fused on. Although glass frits with a high bismuth content exhibit improved properties, such frits are, depending on the bismuth content, much more expensive than glass frits that have a low bismuth content or that are free from bismuth. In addition, the glass flux also contains 2 to 6 wt-% $Li_2O$, resulting in a distinct weakening of the fracture resistance of the enamelled glass, particularly in the case of multiple printing.

A similar way of avoiding the adhesion of coated panes of glass in the course of the press-and-bend process is described by WO 92/0429: the composition which forms an enamel during stoving contains a crystallizable glass frit and nucleating agents based on $Zn_2SiO_4$. A disadvantage is that glass enamels based on zinc silicates only have a moderate resistance to acids, so that use in electroplating baths is not possible.

Anti-stick glass colorants such as are described in U.S. Pat. No. 4,959,090 are suitable for use with a view to the production of enamelled bent panes of glass in press-and-bend furnaces. With a view to achieving the anti-stick property the colouring preparations contain metal powder. A disadvantage of the glass enamels produced with these preparations is their inadequate resistance to acids: in addition, a discoloration of the black colours into grey-streaked or brown-streaked colour tones occurs.

The known problem of diffusion of silver from a silver paste which is printed onto the enamel colorant during stoving can be eliminated in accordance with EP-A 0 504 682 by sulphides or polysulphides being added with a view to producing a frit that contains lead. But such enamel colorants contain the unwanted lead. For the same purpose, in accordance with EP-A 0 505 892 lead-free glass frits are disclosed which contain sulphur or sulphides in dissolved form; the frits contain a high proportion of zinc oxide, as a result of which the resistance to acids is again reduced.

DESCRIPTION OF THE INVENTION

It is accordingly the object of the present invention to provide a new glass composition, in particular in the form of a glass frit, which in its entire spectrum of properties is better suited to the production of glazes, enamels, in particular glass enamels, and other ceramic decorative coating compounds than the systems previously known. The new glass compositions should be substantially free from lead, zinc and lithium, in order to avoid the disadvantageous influences of these elements that were pointed out previously.

The object is achieved by means of a glass composition containing (in mol-%)

| | |
|---|---|
| $K_2O$ | 10–17 |
| $B_2O_3$ | 10–25 |
| $TiO_2$ | 15–30 |
| $SiO_2$ | 35–55 |
| $Al_2O_3$ | 0–5 |
| $Bi_2O_3$ | 0–5 |
| S | 0–3 | and oxides from the group consisting of PbO, CdO, ZnO, $Li_2O$, $Na_2O$, MgO, CaO, SrO, BaO and $P_2O_5$ in a quantity of less than 0.5 wt-% in each case.

The glass composition preferably contains (in mol-%).

| | |
|---|---|
| $K_2O$ | 10–17 |
| $B_2O_3$ | 10–25 |
| $TiO_2$ | 15–30 |
| $SiO_2$ | 35–50 |
| $Bi_2O_3$ | 0–3 |
| S | 0–2 | and less than a total of 5 wt-% of other metal oxides. A particularly preferred glass composition contains (in mol-%)

| | |
|---|---|
| $K_2O$ | 13–16 |
| $B_2O_3$ | 18–23 |
| $TiO_2$ | 17–23 |
| $SiO_2$ | 40–45 |
| $Bi_2O_3$ | 0–3 |
| S | 0–2 | an less than a total of 3 wt-% of other metal oxides.

Normally the transformation point $T_g$ measured by means of the DSC method (Differential Scanning Calorimetry) lies below 550° C., preferably below 535° C.

As previously described, the frit according to the invention is based on $K_2O$, $B_2O_3$, $TiO_2$ and $SiO_2$. A further essential feature of the invention is that the frit is substantially free from PbO, $P_2O_5$, ZnO, $Li_2O$, $Na_2O$ and also from alkaline-earth metal oxides. Small proportions (less than 0.5 wt-%) of the oxides that are intrinsically undesirable may find their way into into the new glass composition, on the one hand in the form of pollutants in the raw materials for glass production and on the other hand by means of residues, within the glass-melting furnace used, of a glass that contains these undesirable substances. The content of these undesirable oxides is preferably kept as low as possible.

The glass composition is suitably present in the form of a glass frit. Glass frits are obtainable, in a manner known as such, by conventional raw materials for glass production being fused together in a molar composition corresponding substantially to the composition of the glass frit to be produced, by the melt being quenched, possibly by allowing a jet of melt to run into water, and by the brittle material so obtained being ground down. By way of rat materials for production of the glass frits according to the invention, use is made, suitably directly, of the oxides, with the exception of $K_2O$ which is usually used in the form of the carbonate. If the glass frit is to contain dissolved sulphur—migration of silver is avoided or stopped by the presence of sulphur that is dissolved within the glass frit—sulphur is used in excess in relation to the composition of the glass frit; melting is suitably effected at the same time under reducing conditions in order to avoid too great a discharge of sulphur dioxide that evolves.

The essential functions of the principal components of the glass composition of the glass frit are discussed below:

By way of alkali component, use is typically made only of potassium oxide. An a typical network modifier the latter greatly reduces the viscosity of the flux and should therefore be present in a proportion amounting to at least mol-%. Since with increasing $K_2O$ content the coefficient of thermal expansion of the glass frit increases considerably, the upper limit in restricted to 17 mol-%. A higher $K_2O$ content in the case of the use of the glass frit on glass substrates results in stresses. By means of boric acid the melting-point of the frit is lowered, but, a quantity of around, and in particular above, 25 mol-% results in the resistance to acids being impaired. By virtue of the presence of titanium dioxide, on the one hand the resistance to acids is raised, and on the other hand in the case of concentrations above 15 mol-% the viscosity of the glass melt is lowered. Surprisingly, despite the relatively high content of titanium dioxide in the glass composition according to the invention, the glass frit can be melted homogeneously and without premature crystallization effects. $SiO_2$ is used as glass-former; a content of $SiO_2$ below 35 mol-% results in an undesirables lowering of the resistance to acids. Aluminium oxide may be contained in a small quantity in the glass composition as an optional constituent. By virtue of the presence of bismuth oxide, on the one hand the chemical resistance is raised, and on the other hand the melting-point is lowered. However, the use of $Bi_2O_3$ is not necessary. As already explained above, an addition of sulphur within the glans composition serves to reduce the migration of silver in automobile-glass colorants; in general a content of as little as about 0.5 mol-% sulphur results in a sufficient reduction in the migration of silver.

As already mentioned above, the glass frits according to the invention can be fused on the substrate so as to form a pore-free layer of glass. After the actual melting process, crystallization effects arise which with regard to the usability of the glass frits in glass colorants for the automobile-glass field are desirable for the purpose of avoiding adhesion in the course of the press-and-bend process. The minimum melting-temperature $T_s$ of preferred glass frits according to the invention lies below 640° C., preferably in the range between 590 and 620° C. The minimum melting-temperature $T_s$ is ascertained during the 4-minute firing onto glass as substrate; the freedom from pores in the fused-on and hence stoved glass frit is used by way of assessment criterion. If, with regard to the application, a lower minimum melting-temperature in desired, such a temperature can be achieved by the use of a mixture consisting of a glass frit according to the invention and a previously known lead-free glass frit with a lower melting-temperature.

Surprisingly, the staved glass frits according to the invention also exhibit a very good resistance to 3 wt-% hydrochloric acid at room temperature after 5 minutes' exposure-time. By adopting a 5-point scale of assessment (1=separated; 2=abradable; 3=matte; 4=weak corrosion; 5=no corrosion) it is possible far a resistance to acids in the range between 3 and 5, preferably between 4 and 5, to be assigned to the stoved glass frit according to the invention.

By reason of the unexpectedly favourable spectrum of properties of the glass composition according to the invention, glass frits of this composition are highly suitable for the production of glass enamels and other ceramic decorations. For such purposes use is made of colouring preparations which contain at least one glass frit and an inorganic ceramic colouring pigment and/or a colouring frit. Accordingly, a colouring preparation according to the invention is characterised by the fact that it contains a glass frit according to the invention. A preferred colouring preparation contains: one or more glass frits according to the invention in a quantity of 35 8to 97 wt-%. one or more colouring pigments in a quantity of 3 to 30 wt-% and one or more other lead-free glass flits in a quantity of 0 to 35 wt-% possibly those which are described in the documents previously cited. Suitable by way of colouring pigments are the known oxidic, sulphidic and nitridic colouring pigments, provided that they are stable under the conditions of stoving. In the case of glass colorants for the automobile-glass field, use is preferably made of oxidic pigments, possibly those based on spinel.

The colouring preparations can be applied dry to the substrate or preferably, after conversion into a colouring paste by the use of a conventional medium, by means of injecting, pouring or screen printing. The colouring paste contains such a quantity of a colouring preparation previously described that it has a consistency suitable for injecting, pouring or screen printing. With a view to production of the colouring paste, use is made of a commercially available tedium that is conventional for such purposes; screen-printing media essentially contain a liquid, organic, organic-aqueous or aqueous solvent that is suitable for suspension of the solids, a polymeric organic binding agent and, as required, auxiliary substances for adjusting the rheological properties of the paste and also for accelerating drying after imprinting.

With a view to producing a glass enamel or a different ceramic decoration on a stovable substrate, the application of a layer of the enamel-forming or decoration-forming composition on the substrate is followed by firing at a temperature adapted to the substrate.

In the production of enamelled panes for the motor-vehicle field the colorant is usually applied by using the screen-printing process; after drying, stoving takes place during the conventional bending and prestressing process, The colouring pastes according to the invention exhibit good anti-sticking properties, so they can be stoved in press-and-bend furnaces without adhesion problems. In such furnaces the stoving and shaping is effected at a temperature of around, and in particular below, 650° C., preferably at a temperature between 610 and 640620 C., with firing-times of, in general, between 2 and 5 minutes. If a conducting path is also to be disposed on the pane of glass, then subsequent to imprinting of the glass plate by means of a colouring paste according to the invention, a silver conductive paste is applied after said colouring paste has dried, suitably likewise using the screen-printing process. The system coated in this way is stoved in a single firing, whereby the conducting path bonds firmly to the layer of glass enamel.

The glass composition according to the invention and also the objects produced with it are distinguished by a number of outstanding properties: they are substantially free from lead and cadmium a feature which is important for environmental and toxicological reasons, As a result of the fact that lithium compounds are largely absent there is no danger of a reduction in the fracture resistance of panes of glass enamelled with the glass composition. Glass enamels formed from the glass composition according to the invention exhibit a diminished diffusion of silver, particularly if they contain dissolved sulphur. Since the glass composition according to the invention contains no bismuth oxide or only a small quantity thereof, no use, or only slight use, of expensive bismuth oxide is required. Glass enamels produced by the use of the glass composition exhibit an excellent pore-free malting behaviour; only after complete melting do crystallization phenomena occur, a feature which with regard to the use in glass enamels for panes of glass deformed by means of the press-and-bend process is important for the motor-vehicle field. Finally, the high resistance to acids of the glass enamels or ceramic decorations obtained by the use of the glass composition according to the invention should be emphasised. The property of crystallization after the glass composition has been fused on the substrate also makes glass frits of this composition particularly suitable as a constituent of white decorative colorants for the production of ceramic decorations. Such white decorative colorants, which besides the glass frit may contain conventional white pigments, are distinguished by an unusual degree of whiteness.

EXAMPLES 1 TO 6

Some typical compositions (in mol-%) of the frits according to the invention are shown in the following table: furthermore, the table contains measured characteristics transformation point $T_g$ by means of the DSC method, minimum melting-temperature $T_s$ during 4-minute firing onto glass and also the resistance to acids (RA) of the stoved colorant to 3% HCl at room temperature after 5-min exposure-time (5-point scale: 1=separated; 2=abradable; 3=matte; 4=weak corrosion; 5=no corrosion).

| Example | Addition (mol-%) | $K_2O$ (mol-%) | $B_2O_3$ (mol-%) | $TiO_2$ (mol-%) | $SiO_2$ (mol-%) | $T_g$ in °C. | $T_s$ in °C. | RA |
|---|---|---|---|---|---|---|---|---|
| 1 |  | 10 | 20 | 20 | 50 | 535 | 680 | 5 |
| 2 | 2 $Na_2O$ | 10 | 20 | 20 | 48 | 528 | 710 |  |
| 3 |  | 15 | 25 | 25 | 35 | 521 | 620 | 3 |
| 4 |  | 15 | 21.7 | 21.7 | 41.6 | 531 | 630 | 5 |
| 5 | 2.5 $B_2O_3$ | 15 | 19.2 | 21.7 | 41.6 | 528 | 610 | 5 |
| 6 | 1.5 S | 15 | 23.5 | 17.5 | 42.5 | 525 | 620 | 4 |

Examples 1 and 2 show that with contents of potassium oxide amounting to 10 mol-% the melting-temperatures for a single application onto glass are ver high, so that application in a blend with a frit that melts at a lower temperature is indicated. Example 2 shows that the introduction of $Na_2O$ further increases the stoving-temperature in undesirable manner. Example 3 shows a medium resistance to acids, which is attributed to the high $B_2O_3$ content.

Examples 4 to 6 show frit compositions which are outstandingly suitable for use in glass colorants and decorative colorants by reason of the good resistance to acids and the low stoving-temperatures.

EXAMPLE 7

Production of a white decorative colorant for instrument glass.

90 parts by weight of the frit according to Example 5 were ground with 10 parts by weight of a conventional $TiO_2$ white pigment based on anatase in a ball mill with water to an average grain size D 50% of 5 μm. The powder was dried and made into a paste that is ready for screen printing with a conventional screen-printing medium (Cerdec 80858) in a ratio of 100 parts by weight of powder to 40 parts by weight of medium. Printing was effected with a screening cloth 43 T onto 4 mm clear glass. Stoving was effected at a glass temperature of 630° C. in 4 min. The stoved colorant showed an outstanding degree of whiteness and a very good resistance to acids.

EXAMPLES 8 TO 11

Production of black glass enamel on automobile glass

In each case finely ground frit powders and colouring-matter powders served as primary materials for various black decorative colorants. The principal Component was the frit according to Example 6. The second frit was a commercially available lead-free, bismuth-containing frit with a minimum melting-temperature of 600° C. after 4 min stoving-time. A commercially available black pigment based on Co, Mn, Fe, Cr spinel served as colouring matter. The raw materials were mixed dry in various ratios and made into a paste with a conventional screen-printing medium 25 (Cerdec 80893) by means of a mixer and a three-roll mill.

The colouring pastes obtained were printed with a 62 T screen-printing cloth onto the bath side of 4 mm-green glass and dried at 130° C. Imprinting of a meandering conducting path consisting of a 65 wt-% silver conductive paste (Cerdec SP 627) was then effected by means of a 100 T cloth.

Stoving of the colorants was effected under homogeneous conditions at a furnace temperature of 660° C. for between 3 and 4.5 min. The following characteristics of the stoved colorants were assessed:

TL Transmission of light in %

Gloss Tri-Gloss reflectometer at 85° t min Minimum stoving-time in minutes at 660° C. furnace temperature

Resistance to acids 3% HCl after 5 min exposure-time

Silver penetration Discoloration of the glass under the silver print

| Example | Frit No. 6 | Lead-free frit | Colouring matter | TL | Gloss | t 660 °C. | Resistance to acids | Ag penetration |
|---|---|---|---|---|---|---|---|---|
| 8 | 80 | 0 | 20 | 0.09 | 12 | 4 | 4 | no |
| 9 | 70 | 15 | 15 | 0.15 | 8.5 | 4 | 4 | no |
| 10 | 60 | 15 | 25 | 0.03 | 7.6 | 4 | 4 | no |
| 11 | 50 | 25 | 25 | 0.03 | 9.5 | 3.5 | 4 | no |

The tests showed that the colours are characterized by an outstanding opacity, TL<0.2%, and a very matte surface. No brown or bluish discoloration of the float glass tinder the silver print is observed. The stoving conditions and also the resistance to acids fully satisfy the technical requirements.

What is claimed is:

1. A substrate coated with a glass enamel wherein the enamel is obtained by stoving an enamel-forming composition comprising at least one glass frit and an inorganic ceramic coloring pigment and/or coloring frit, wherein said glass frit is formed from a composition consisting essentially of (in mol-%)

| | |
|---|---|
| $K_2O$ | 10–17 |
| $B_2O_3$ | 10–25 |
| $TiO_2$ | 15–30 |
| $SiO_2$ | 35–55 |
| $Al_2O_3$ | 0–5 |
| $Bi_2O_3$ | 0–5 |
| S | 0–3 | and optionally containing at least one metal oxide selected from the group consisting of PbO, CdO, ZnO, $Li_2O$, $Na_2O$, MgO, CaO, SrO, BaO and $P_2O_5$, said oxide or oxides being present in a quantity of less than 0.5 wt-%, in each case.

2. A substrate coated with a glass enamel wherein the enamel is obtained by stoving a coloring paste comprising at least one glass frit and an inorganic ceramic coloring pigment and/or a coloring frit suspended in a liquid medium in an amount sufficient to achieve a consistency suitable for injecting, pouring or screen printing; and wherein said glass frit is formed from a composition consisting essentially of (in mol-%)

| | |
|---|---|
| $K_2O$ | 10–17 |
| $B_2O_3$ | 10–25 |
| $TiO_2$ | 15–30 |
| $SiO_2$ | 35–55 |
| $Al_2O_3$ | 0–5 |
| $Bi_2O_3$ | 0–5 |
| S | 0–3 | and optionally containing at least one metal oxide selected from the group consisting of PbO, CdO, ZnO, $Li_2O$, $Na_2O$, MgO, CaO, SrO, BaO and $P_2O_5$, said oxide or oxides being present in a quantity of less than 0.5 wt-%, in each case.

3. The substrate of claim 1, wherein said glass frit is formed from a composition which consists essentially of (in mol-%)

| | |
|---|---|
| $K_2O$ | 10–17 |
| $B_2O_3$ | 10–25 |
| $TiO_2$ | 15–30 |
| $SiO_2$ | 35–50 |
| $Bi_2O_3$ | 0–3 |
| S | 0–2 | and less than a total of 5 wt-% of said other metal oxides.

4. The substrate of claim 3, wherein the glass frit is formed from a composition which consists essentially of (in mol-%)

| | |
|---|---|
| $K_2O$ | 13–16 |
| $B_2O_3$ | 18–23 |
| $TiO_2$ | 17–23 |
| $SiO_2$ | 40–45 |
| $Bi_2O_3$ | 0–3 |
| S | 0–2 | and less than a total of 3 wt-% of said other metal oxides.

5. The substrate of claim 2, wherein said glass frit is formed from a composition which consists essentially of (in mol-%)

| | |
|---|---|
| $K_2O$ | 10–17 |
| $B_2O_3$ | 10–25 |
| $TiO_2$ | 15–30 |
| $SiO_2$ | 35–50 |
| $Bi_2O_3$ | 0–3 |
| S | 0–2 | and less than a total of 5 wt % of said other metal oxides.

6. The substrate of claim 5, wherein said glass frit is formed from a composition which consists essentially of (in mol-%)

| | |
|---|---|
| $K_2O$ | 13–16 |
| $B_2O_3$ | 18–23 |
| $TiO_2$ | 17–23 |
| $SiO_2$ | 40–45 |
| $Bi_2O_3$ | 0–3 |
| S | 0–2 | and less than a total of 3 wt-% of said other metal oxides.

7. The substrate of claim 1, wherein the enamel-forming composition comprises 35 to 97 wt % of said glass frit, 3 to 30% of at least one coloring pigment and 0 to 35 wt % of at least one other lead-free glass frit.

8. The substrate of claim 2, wherein the coloring paste composition comprises 35 to 97 wt % of said glass frit, 3 to 30% of at least one coloring pigment and 0 to 35 wt % of at least one other lead-free glass frit suspended in the liquid medium.

9. The substrate of claim 1, wherein said glass frit has a minimum melting temperature $T_s$ during a 4-minute stoving at less than 640° C.

10. The substrate of claim 2, wherein said glass frit has a minimum melting temperature $T_s$ during a 4-minute stoving at less than 640° C.

11. The substrate coated with a glass enamel according to claim 1, wherein the substrate is glass.

12. The substrate coated with a glass enamel according to claim 2, wherein the substrate is glass.

13. The substrate coated with a glass enamel according to claim 3, wherein the substrate is glass.

14. The substrate coated with a glass enamel according to claim 4, wherein the substrate is glass.

15. The substrate coated with a glass enamel according to claim 5, wherein the substrate is glass.

16. The substrate coated with a glass enamel according to claim 6, wherein the substrate is glass.

17. The substrate coated with a glass according to claim 11, wherein the glass substrate is a flat pane or a shaped pane.

18. The substrate coated with a glass according to claim 17, wherein the glass substrate is a flat pane or a shaped pane.

19. The substrate coated with a glass enamel according to claim 11, further comprising, on the glass enamel, a silver conducting path which is disposed and firmly bonded to said glass enamel.

20. The substrate coated with a glass enamel according to claim 12, further comprising, on the glass enamel, a silver conducting path which is disposed and firmly bonded to said glass enamel.

* * * * *